United States Patent [19]

Morimoto

[11] Patent Number: 4,747,325
[45] Date of Patent: May 31, 1988

[54] TRANSMISSION RATIO CONTROL SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 944,348

[22] Filed: Dec. 19, 1986

[30] Foreign Application Priority Data

Dec. 25, 1985 [JP] Japan .................... 60-295444

[51] Int. Cl.⁴ .................. B60K 41/12; B60K 41/18
[52] U.S. Cl. ............................. 74/866; 364/424.1
[58] Field of Search .................... 74/866; 364/424.1

[56] References Cited

U.S. PATENT DOCUMENTS

| 4,509,125 | 4/1985 | Fattic et al. ............. 364/424.1 |
| 4,536,171 | 8/1985 | Tanaka et al. ............ 74/866 X |
| 4,649,487 | 3/1987 | Osanai et al. ............ 74/866 X |
| 4,653,004 | 3/1987 | Osanai et al. ............ 74/866 X |
| 4,653,006 | 3/1987 | Osanai et al. ............ 74/866 X |

FOREIGN PATENT DOCUMENTS 59-217047 7/1984 Japan .

Primary Examiner—Dirk Wright
Attorney, Agent, or Firm—Martin A. Farber

[57] ABSTRACT

A control system has a transmission ratio control valve having a spool for controlling oil supplied to a cylinder of a drive pulley to change the transmission ratio. By controlling the pressure of oil supplied to one end of the spool of the transmission ratio control valve in accordance with conditions of the engine and transmission, the spool is shifted, so that the rate of change of the transmission ratio is controlled. Actual rate of change of the transmission ratio is compared with a desired rate of change to produce an error signal. In response to the error signal, the actual rate of change is converged to the desired rate of change.

10 Claims, 5 Drawing Sheets

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the speed of changing the transmission ratio in accordance with driving conditions of the vehicle.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

When starting of the vehicle, the transmission ratio is set at a maximum value. When the vehicle speed and engine speed reach set values under a driving condition, the transmission ratio starts to change (to upshift). At that time if the engine speed is kept constant, the transmission ratio is automatically and continuously reduced at a speed which is determined by line pressure, the pressure of oil supplied to the servo device of the drive pulley, and the actual transmission ratio. In such a system, the rate of change of the transmission ratio (hereinafter called transmission ratio changing speed) up to a desired transmission ratio can not be controlled in accordance with driving conditions. Accordingly, hunting or overshooting of the of transmission ratio occurs, which decreases the driveability of the vehicle.

Japanese Patent Laid Open No. 59-217047 shows a system which operates to control the transmission ratio changing speed with a constant increment Δe in accordance with the deviation of the actual transmission ratio from a desired ratio. However, if the value of the increment Δe is increased in order to quickly control the transmission ratio, overshooting of the control operation occurs. To the contrary if the value Δe is reduced in order to prevent the overshooting, the response of the control system deteriorates.

SUMMARY OF THE INVENTION

The object of the present invention is to provide a system which may reliably control the transmission ratio changing speed.

According to the present invention, the control system has a drive pulley including a hydraulically shiftable disc and a first hydraulic cylinder for shifting the disc, a driven pulley including a hydraulically shiftable disc and a second hydraulic cylinder for operating the disc, a belt engaged wtih both pulleys, a transmission ratio control valve having ports and a spool, and a first hydraulic circuit having a pump for supplying oil to the first and second cylinders through the transmission ratio control valve.

The system further comprises first means for detecting operating conditions of the engine and the transmission and for producing a condition signal, second means responsive to the condition signal for producing a desired transmission ratio changing speed signal, third means responsive to the desired transmission ratio changing speed signal for shifting the spool of the transmission ratio control valve so as to provide a transmission ratio at the changing speed, detecting means for detecting actual transmission ratio changing speed and for producing an actual speed signal, fourth means responsive to the desired transmission ratio changing speed signal and to the actual speed signal for producing an error signal, fifth means responsive to the error signal for correcting the desired transmission ratio changing speed signal.

The other objects and features of this invention will become understood from the following description with reference to the accompanying drawings.

DETAILED DESCRIPTION OF THE PREFERRED EMBODIMENT

Figure 1:
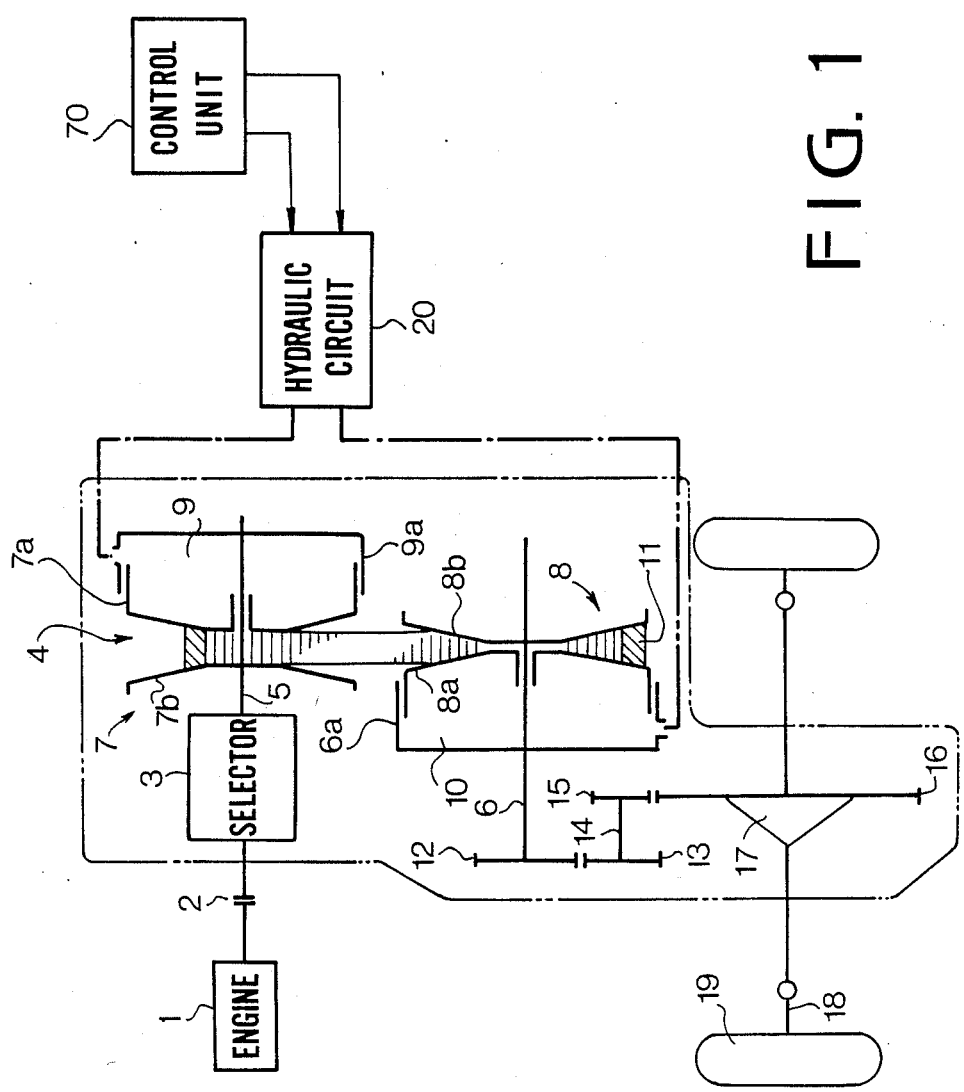
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages wtih a final gear 16. The rotation of the final gear 16 is transmitted to axles 18 of vehicle driving wheels 19 through a differential 17.

Figure 2A:
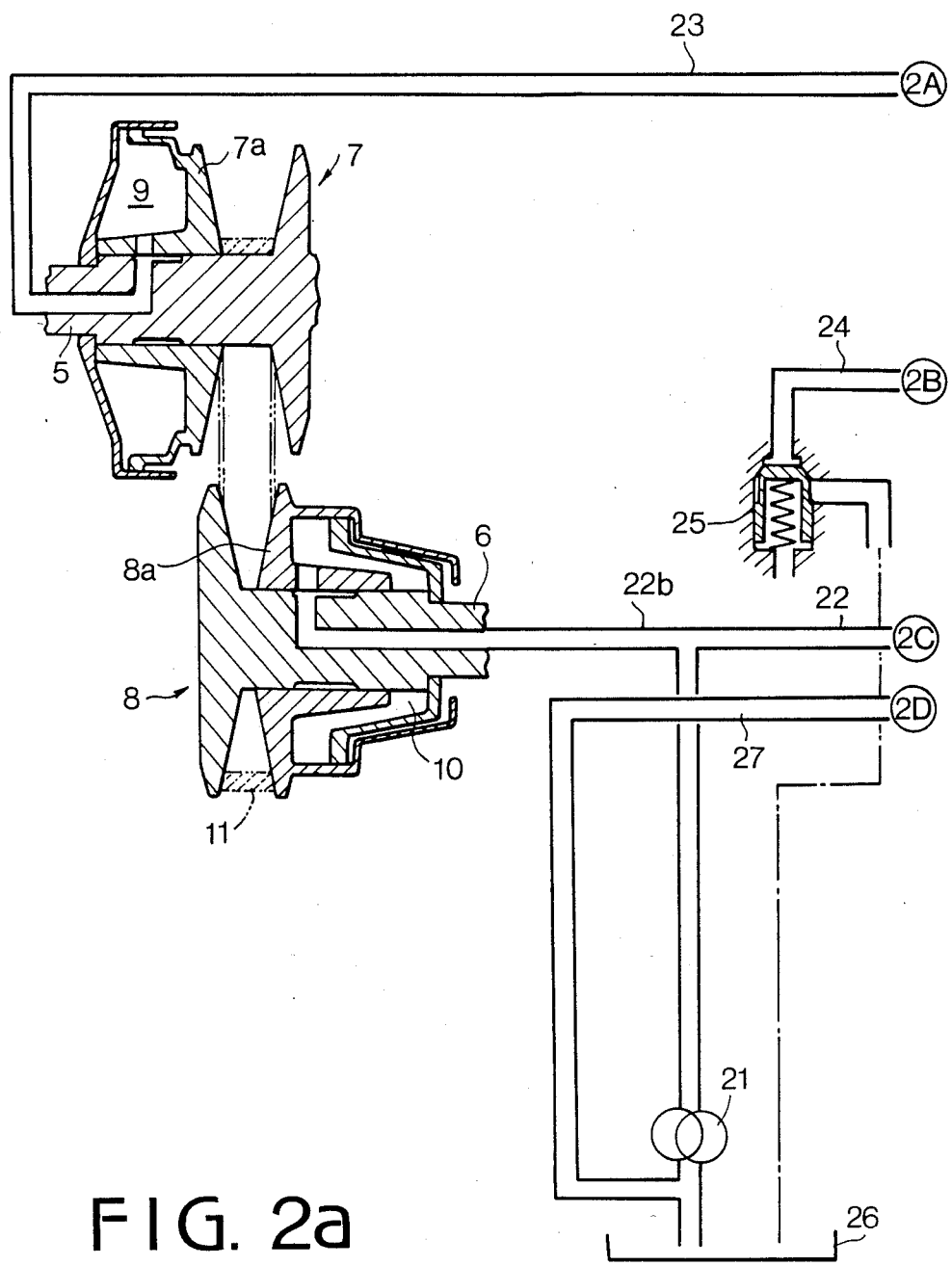
FIGS. 2a and 2b are schematic diagrams showing a control system according to the present invention.
Figure 2B:
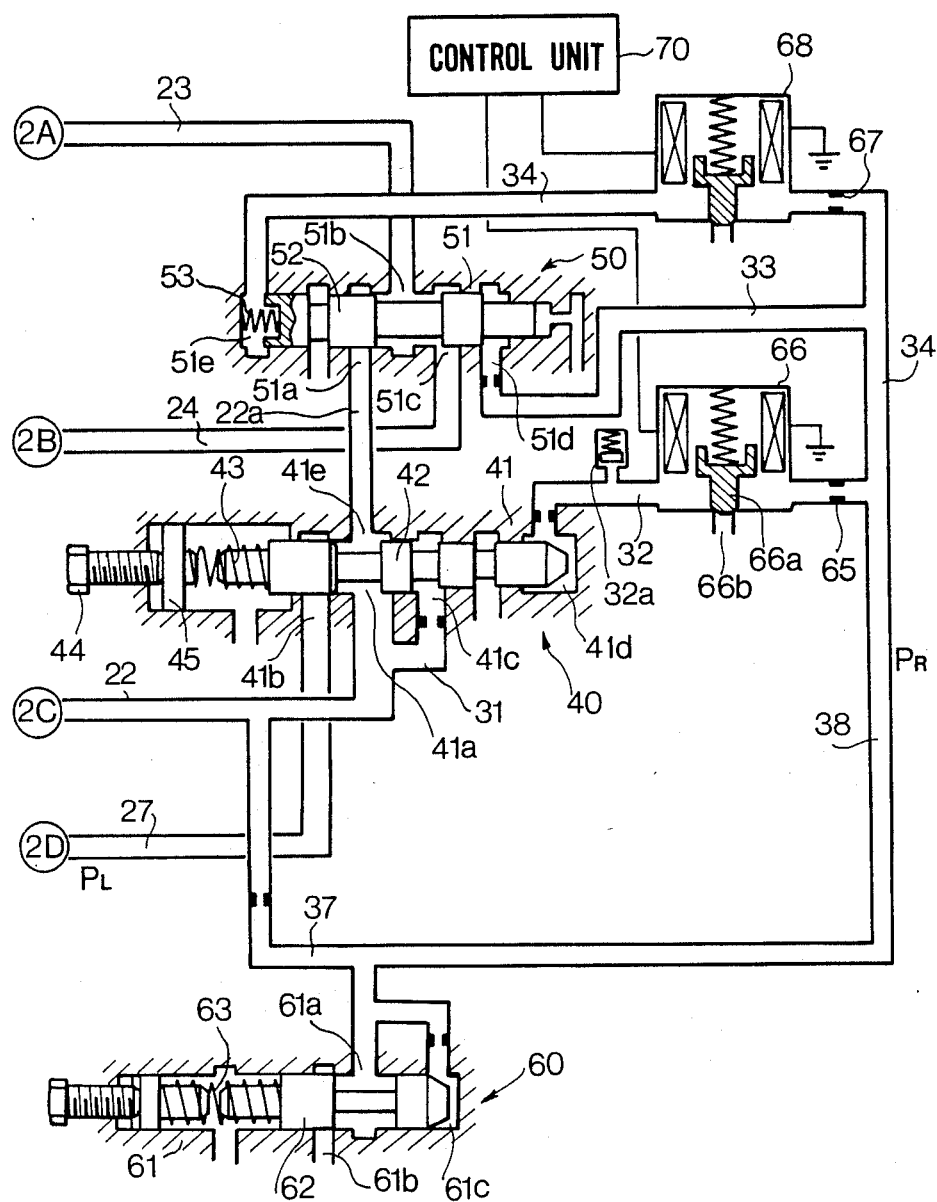

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and a conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool. The port 51b communicates with the chamber 9 through conduit 23, and the port 51a communicates with port 41e of the line pressure control valve 40 through conduit 22a. The drain port 51c is communicated with the oil reservoir 26 through a conduit 24 and a check valve 25.

The system is provided with a regulator valve 60, and solenoid operated on-off control valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 53e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The on-off valves 66 and 68 are operated by signals from a control unit 70. Thus, pressure controlled by the on-off valves 66 and 68 is applied to the chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value which is the same as the constant pressure in the chamber 51d, when the duty ratio is 0%, and zero by controlling the duty ratio of the pulses for operating the on-off valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber 51e. Further, the speed of the movement of the spool 52 changes with the magnitude of changing duty ratio. The spool 52 is shifted to an oil drain position by decreasing the duty ratio. It will be understood that when the oil is supplied to the chamber 9, the transmission is upshifted.

Figure 3:
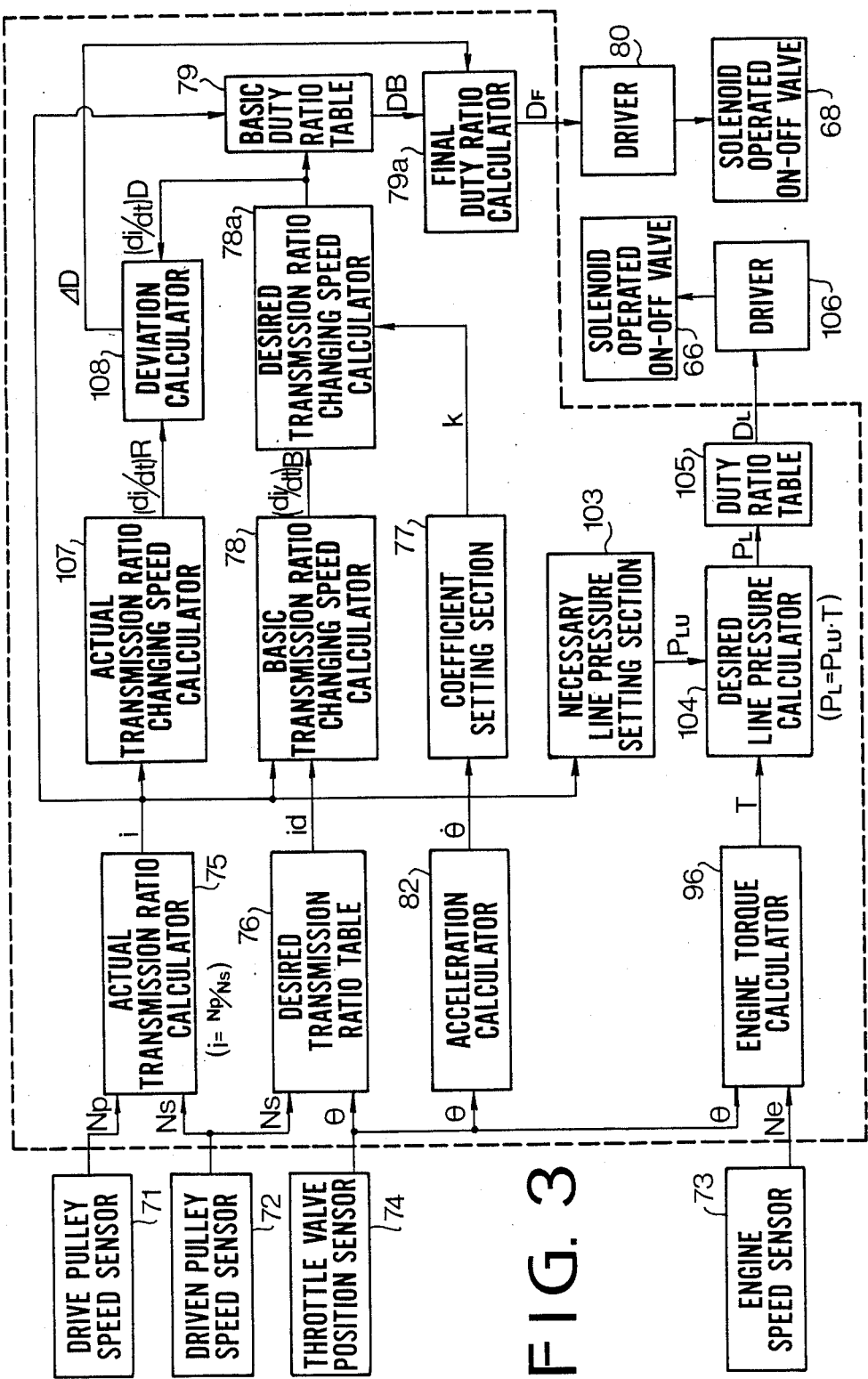
FIG. 3 is a block diagram showing a control unit.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of sensors 71, 72 are fed to an actual transmission ratio calculator 75 to produce an actual transmission ratio i in accordance with $i = N_p / N_s$. Output signal $N_s$ and output signal $\theta$ of the throttle position sensor 74 are fed to a desired transmission ratio table 76. The desired transmission ratio id is obtained by the table 76 in accordance with the signals $N_s$ and $\theta$. The actual transmission ratio i and desired transmission ratio id are applied to a basic transmission ratio changing speed calculator 78 to produce an output signal (di/dt)B. On the other hand, the output $\theta$ is fed to an acceleration calculator 82 to obtain a signal representing the acceleration $\dot{\theta}$. The signal of the acceleration $\dot{\theta}$ is supplied to a coefficient setting section 77 to produce a coefficient K. The signal (di/dt)B and coefficient K from the coefficient setting section 77 are applied to a desired transmission ratio changing speed calculator 78a to produce a desired transmission ratio changing speed (di/dt)D.

The speed (di/dt)D and actual ratio i are applied to a basic duty ratio table 79 to derive a basic duty ratio DB which is applied to a final duty ratio table 79a to produce a final duty ratio DF, as described hereinafter. The final duty ratio DF is supplied to the solenoid operated valve 68 through a driver 80.

Further, the output signal $\theta$ of throttle position sensor 74 and the output $N_e$ of engine speed sensor 73 are fed to an engine torque calculator 96, so that engine torque T is calculated based on throttle position $\theta$ and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In the system of the present invention, the actual transmission ratio signal i is fed to an actual transmission ratio changing speed calculator 107 to produce an actual transmission ratio changing speed (di/dt)R. The actual speed (di/dt)R and desired speed (di/dt)D are applied to a deviation calculator 108 to produce an error signal. In accordance wtih the error signal, a correcting value $\Delta D$ is obtained from a table. The correcting value $\Delta D$ is applied to the final duty ratio calculator 79a to produce final duty ratio DF(=DB +$\Delta D$).

In operation, while the vehicle is at a stop, the chamber 10 of the driven pulley 8 is supplied with line pressure through passage 22b, and the chamber 9 of the drive pulley 7 is drained, since the $N_p$, $N_s$, $\theta$ and the duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started.

At that time the line pressure is at the highest value by the pressure control valve 40, since the duty ratio for the valve 66 is large, and the spool 42 of the control valve 40 is at the right end position. When the throttle valve is opened for acceleration, the desired transmission ratio id and the desired transmission ratio changing speed (di/dt)D are calculated by calculators 76, 78a, and the final duty ratio DF is obtained from the calculator 79a. The value of the duty ratio DF is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23. On the other hand, the duty ratio for the on-off valve 66 is reduced, thereby shifting the spool 42 of the valve 40 to the left. The port 41a communicates with the port 41b of the drain passage 27. Thus, line pressure reduces, and the transmission is upshifted, since oil is still supplied to the chamber 9 through the control valve 50. When the vehicle speed (output signal $N_s$) exceeds a predetermined value, the clutch 2 is entirely engaged. As the difference between the desired ratio id and actual ratio i becomes large, the duty ratio for the on-off valve 68 becomes large thereby increasing the transmission changing speed di/dt. When the opening degree of the throttle valve is reduced for deceleration, the duty ratio is reduced, thereby shifting the spool 52 to the right to drain the chamber 9. Thus, the transmission is downshifted. The transmission ratio changing speed at downshifting increases with reducing of the duty ratio.

When the vehicle is accelerated at steady state, acceleration $\theta$ increases to increase the coefficient K. Accordingly, the transmission is quickly downshifted, thereby promoting the acceleration.

From the engine torque calculator 96, a torque T is obtained in accordance with throttle position $\theta$ and engine speed $N_e$, which is applied to the desired line pressure calculator 104. The calculator calculates the desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

Figure 4A:
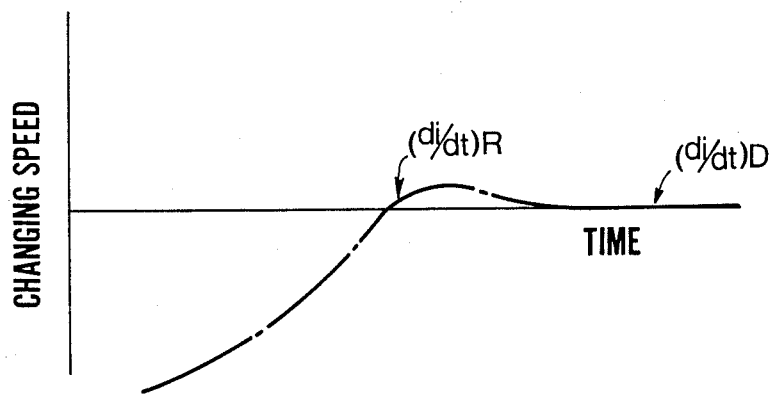
FIG. 4a is a graph showing variation of transmission ratio changing speed.
Figure 4B:
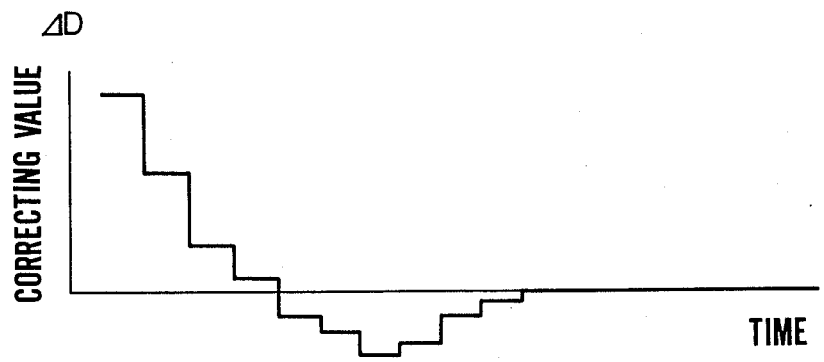
FIG. 4b is a graph showing variation of correcting value.

As described above, the actual transmission ratio changing speed (di/det)R is fed back and compared with the desired transmission ratio changing speed (di/dt)D to produce the correcting value $\Delta$D dependent on the error signal by the deviation calculator 108. The system controls the actual transmission ratio changing speed so that the error signal becomes zero by the feedback operation. Thus, the actual changing speed coincides with the desired changing speed, whereby the driveability of the vehicle can be improved. FIGS. 4a and 4b show the correcting operation.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting the power of an internal combustion engine to driving wheels of a motor vehicle through a clutch, having a drive pulley including a hydraulically shiftable disc and a first hydraulic cylinder for shifting the disc, and a driven pulley including a hydraulically shiftable disc and a second hydraulic cylinder for operating the disc of the driven pulley, a belt engaged with both pulleys, a transmission ratio control valve having ports and a spool, a first hydraulic circuit having a pump for supplying oil to the first hydraulic cylinder through the transmission ratio control valve, the system comprising:

first means for detecting operating conditions of the engine and the transmission and for producing a condition signal;

second means responsive to the condition signal for producing a desired rate of change of transmission ratio;

third means responsive to the desired rate of change of the transmission ratio for shifting the spool of the transmission ratio control valve dependent on the desired rate of change of the transmission ratio;

detecting means for determining actual rate of change of the transmission ratio;

fourth means responsive to the desired rate of change of the transmission ratio and to the actual rate of change of the transmission ratio for producing an error signal;

fifth means responsive to the error signal for correcting the desired rate of change of the transmission ratio.

2. The system according to claim 1 wherein the first means comprises means for producing a desired transmission ratio signal, means for producing an actual transmission ratio signal, and means for producing an engine acceleration signal.

3. The system according to claim 1 wherein the third means includes a second hydraulic circuit for supplying oil to the transmission ratio control valve so as to shift the spool, and control valve means provided in the second hydraulic circuit for controlling the amount of oil supplied to the transmission ratio control valve.

4. In a control system for a continuously variable transmission having a continuously variable transmission ratio for transmitting power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system having a transmission ratio control valve having ports and a shiftable spool, and a first hydraulic circuit having a pump for supplying oil to the first hydraulic cylinder via the transmission ratio control valve and to the second hydraulic cylinder, the improvement in the system comprising:

first means for producing a desired rate of change of transmission ratio;

second means responsive to the desired rate of change of the transmission ratio for shifting the spool of the transmission ratio change valve dependent on the desired rate of change of the transmission ratio signal;

third means for determining actual rate of change of the transmission ratio;

fourth means responsive to the desired rate of change of the transmission ratio and to the actual rate of change of the transmission ratio for producing an error signal;

and said second means is further responsive to the error signal for shifting the spool of the transmission ratio control valve dependent on the error signal.

5. The system according to claim 4, wherein said first means is responsive to angular position of a throttle valve of the engine and speed of the driven pulley.

6. The system according to claim 5, wherein said third means determines said actual rate of change of the transmission ratio in response to the ratio of the speeds of the drive and driven pulley.

7. The system according to claim 6, wherein said fourth means produces said error signal dependent on the deviation of said actual rate and said desired rate of change of the transmission ratio.

8. The system according to claim 4, wherein said second means is further responsive to the actual transmission ratio for shifting the spool of the transmission ratio control valve dependent on the actual transmission ratio.

9. The system according to claim 4, wherein said first means is for producing said desired rate of change of the transmission ratio in response to a desired transmission ratio and the actual transmission ratio.

10. The system according to claim 9, wherein said first means is for producing said desired rate of change of the transmission ratio further in response to a rate of change of angular position of a throttle valve of the engine.

* * * * *